United States Patent
Good et al.

(10) Patent No.: US 11,983,382 B2
(45) Date of Patent: May 14, 2024

(54) SYSTEMS AND METHODS FOR GENERATING THREE-DIMENSIONAL MENUS AND TOOLBARS TO CONTROL COMPUTER OPERATION

(71) Applicant: Illuscio, Inc., Culver City, CA (US)

(72) Inventors: Max Good, Los Angeles, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 19 days.

(21) Appl. No.: 18/314,440

(22) Filed: May 9, 2023

(65) Prior Publication Data

US 2023/0400957 A1  Dec. 14, 2023

Related U.S. Application Data

(63) Continuation-in-part of application No. 18/163,516, filed on Feb. 2, 2023, which is a continuation of
(Continued)

(51) Int. Cl.
*G06F 3/048* (2013.01)
*G06F 3/04815* (2022.01)
(Continued)

(52) U.S. Cl.
CPC ...... *G06F 3/04815* (2013.01); *G06F 3/04817* (2013.01); *G06F 3/0487* (2013.01); *G06F 9/451* (2018.02)

(58) Field of Classification Search
CPC ............. G06F 3/04817; G06F 3/04815; G06F 3/0482; G06F 9/451; G06F 3/0487
See application file for complete search history.

(56) References Cited

U.S. PATENT DOCUMENTS 5,801,699 A * 9/1998 Hocker ............... G06F 3/04817
715/837
6,473,751 B1 * 10/2002 Nikolovska ....... G06F 16/90328
707/E17.138
(Continued)

FOREIGN PATENT DOCUMENTS

CN  107506110 A * 12/2017 ......... G06F 3/04817
CN  106325654 B * 9/2019
(Continued)

*Primary Examiner* — Patrick F Riegler
(74) *Attorney, Agent, or Firm* — Ansari Katiraei LLP; Arman Katiraei; Sadiq Ansari

(57) ABSTRACT

Disclosed is a system and associated methods for controlling computer operation through three-dimensional ("3D") menus, 3D toolbars, and other 3D elements that provide an efficient and dynamic organization of application functionality and icons across three dimensions. The system generates a first 3D element with a first number of regions with each region of the first number of regions providing access to different functionality from a first set of functionality, and a second 3D element with a second number of regions with each region of the second number of regions providing access to different functionality from a second set of functionality. The system connects the first 3D element to the second 3D element, and rotates one or more of the first element and the second 3D element to change the functionality that is accessible from the one or more of the first element and the second element.

20 Claims, 10 Drawing Sheets

Related U.S. Application Data application No. 17/838,393, filed on Jun. 13, 2022, now Pat. No. 11,579,748.

(51) Int. Cl.
    *G06F 3/04817*     (2022.01)
    *G06F 3/0487*     (2013.01)
    *G06F 9/451*     (2018.01)

(56) References Cited

U.S. PATENT DOCUMENTS

| Patent/Pub. No. | Date | Inventor | Class |
|---|---|---|---|
| 7,216,305 B1 * | 5/2007 | Jaeger | G06F 3/033 715/848 |
| 7,581,182 B1 * | 8/2009 | Herz | H04N 21/47217 715/713 |
| 8,429,564 B2 | 4/2013 | Alexanderovitc et al. | |
| 8,977,986 B2 * | 3/2015 | Herz | G06F 3/0483 715/848 |
| 9,069,455 B2 * | 6/2015 | Sripada | G06T 19/00 |
| 9,256,289 B2 * | 2/2016 | Song | G06F 3/017 |
| 9,405,435 B2 * | 8/2016 | Hendricks | G06F 3/0482 |
| 11,579,748 B1 | 2/2023 | Barsky | G06F 3/04883 |
| 2002/0000998 A1 | 1/2002 | Scott et al. | |
| 2003/0112279 A1 * | 6/2003 | Irimajiri | H04M 1/72469 715/810 |
| 2003/0117440 A1 | 6/2003 | Hellyar et al. | |
| 2005/0071767 A1 | 3/2005 | Kirkland | |
| 2006/0031874 A1 * | 2/2006 | Ok | G06F 3/04815 725/39 |
| 2006/0031876 A1 * | 2/2006 | Ok | G06F 3/04815 725/39 |
| 2006/0187204 A1 | 8/2006 | Yi et al. | |
| 2006/0242602 A1 | 10/2006 | Schechter et al. | |
| 2007/0120846 A1 * | 5/2007 | Ok | G06F 3/04815 345/419 |
| 2007/0146325 A1 * | 6/2007 | Poston | G06F 3/038 345/163 |
| 2007/0164989 A1 * | 7/2007 | Rochford | H04M 1/72427 345/156 |
| 2007/0300184 A1 * | 12/2007 | Song | G06F 3/04815 715/810 |
| 2009/0037971 A1 * | 2/2009 | Lim | H04N 21/4312 725/131 |
| 2009/0049412 A1 * | 2/2009 | Lee | G06F 3/0482 715/841 |
| 2009/0055776 A1 * | 2/2009 | Audet | G06F 3/04817 715/835 |
| 2009/0089692 A1 | 4/2009 | Morris | |
| 2009/0125801 A1 * | 5/2009 | Algreatly | G06F 3/0481 715/234 |
| 2009/0164945 A1 | 6/2009 | Li | |
| 2010/0093400 A1 | 4/2010 | Ju et al. | |
| 2011/0022988 A1 * | 1/2011 | Lee | H04N 21/47 715/848 |
| 2011/0065478 A1 * | 3/2011 | Kim | G06F 3/0488 345/173 |
| 2011/0102460 A1 | 5/2011 | Parker | |
| 2011/0134110 A1 * | 6/2011 | Song | G06F 3/04815 715/848 |
| 2011/0202424 A1 * | 8/2011 | Chun | G06Q 30/016 705/26.8 |
| 2011/0283213 A1 | 11/2011 | Leebow | |
| 2011/0307834 A1 * | 12/2011 | Wu | G06F 3/0488 715/836 |
| 2011/0310100 A1 | 12/2011 | Adimatyam et al. | |
| 2012/0005622 A1 * | 1/2012 | Park | G06F 3/04886 715/782 |
| 2012/0052917 A1 * | 3/2012 | Kim | G06F 3/04883 455/566 |
| 2012/0062564 A1 | 3/2012 | Miyashita et al. | |
| 2012/0173976 A1 * | 7/2012 | Herz | G06F 3/04815 715/716 |
| 2012/0227000 A1 * | 9/2012 | McCoy | G06F 3/0482 715/762 |
| 2012/0260217 A1 | 10/2012 | Celebisoy | |
| 2012/0260218 A1 * | 10/2012 | Bawel | G06F 3/04815 715/841 |
| 2013/0145322 A1 | 6/2013 | Hendricks | |
| 2013/0318477 A1 * | 11/2013 | Lee | G06F 3/04815 715/848 |
| 2013/0318478 A1 * | 11/2013 | Ogura | G06F 3/0488 715/841 |
| 2013/0336524 A1 | 12/2013 | Zhang et al. | |
| 2013/0346911 A1 * | 12/2013 | Sripada | G06F 3/04817 715/782 |
| 2014/0123081 A1 * | 5/2014 | Park | G06F 3/04817 715/863 |
| 2015/0135105 A1 | 5/2015 | Jain et al. | |
| 2015/0317058 A1 * | 11/2015 | Babarykin | G06F 3/04842 715/765 |
| 2016/0034181 A1 * | 2/2016 | Norris, III | G06F 3/0236 715/773 |
| 2016/0378273 A1 * | 12/2016 | Kaehler | G06F 3/0482 715/841 |
| 2017/0097408 A1 * | 4/2017 | Hazama | G01S 7/6281 |
| 2017/0371039 A1 | 12/2017 | Clark et al. | |
| 2018/0004404 A1 * | 1/2018 | Delfino | G06F 3/04847 |
| 2018/0052583 A1 * | 2/2018 | Kim | G06F 3/04815 |
| 2019/0121522 A1 | 4/2019 | Davis et al. | |
| 2020/0012409 A1 * | 1/2020 | Sadacharam | G06T 19/20 |
| 2020/0077021 A1 * | 3/2020 | Ihara | H04N 5/93 |
| 2021/0192832 A1 * | 6/2021 | Grail | G06F 16/26 |
| 2021/0287451 A1 * | 9/2021 | Baudisch | G06T 19/20 |

FOREIGN PATENT DOCUMENTS

| | | | |
|---|---|---|---|
| EP | 1396985 A2 * | 3/2004 | G06F 3/0482 |
| KR | 2013110464 A * | 10/2013 | |

\* cited by examiner

US 11,983,382 B2

SYSTEMS AND METHODS FOR GENERATING THREE-DIMENSIONAL MENUS AND TOOLBARS TO CONTROL COMPUTER OPERATION

CLAIM OF BENEFIT TO RELATED APPLICATIONS

This application is a continuation-in-part of U.S. nonprovisional application Ser. No. 18/163,516 entitled "Systems and Methods for Interacting with Three-Dimensional Graphical User Interface Elements to Control Computer Operation", filed Feb. 2, 2023, which is a continuation of U.S. nonprovisional application Ser. No. 17/838,393 entitled "Systems and Methods for Interacting with Three-Dimensional Graphical User Interface Elements to Control Computer Operation", filed Jun. 13, 2022 and issued as U.S. Pat. No. 11,579,748. The contents of application Ser. Nos. 18/163,516 and 17/838,393 are hereby incorporated by reference.

BACKGROUND

The two-dimensional ("2D") nature of icons, menus, toolbars, and other graphical user interface ("GUI") elements restricts their functionality and interactivity. For instance, the amount of information and/or options that may be presented in two dimensions is less than the amount of information and/or options that may be presented in three dimensions. Similarly, interactions with a 2D menu or toolbar are restricted to the x and y planes, thereby creating a static GUI element that does not change with the presentation of other three-dimensional ("3D") objects in a 3D environment.

DETAILED DESCRIPTION OF PREFERRED EMBODIMENTS

The following detailed description refers to the accompanying drawings. The same reference numbers in different drawings may identify the same or similar elements.

Provided are systems and methods for generating three-dimensional ("3D") menus and 3D toolbars to control computer operation. The systems and methods include a 3D controller that generates the 3D menus, 3D toolbars, and other 3D graphical user interface ("GUI") elements with an efficient and/or dynamic organization of application functionality and icons across three dimensions. The 3D controller creates a 3D environment for viewing and editing 3D objects across three dimensions using different application functionality that are accessible from 3D arrangements in 3D menus, toolbars, and other 3D GUI elements.

In some embodiments, the 3D controller generates dynamic 3D effects based on user interactions with the 3D menus and 3D toolbars. The dynamic 3D effects include expanding the 3D menus and 3D toolbars in different directions to allow for simpler navigation of complex menus and toolbars with multiple layers of functionality and icons.

In some embodiments, the 3D controller generates the 3D menus and 3D toolbars with dynamic controls and/or outputs based on the functionality associated with the menu or toolbar items and/or state of 3D data in the 3D environment that may be modified by the menu or toolbar items. For instance, the same gesture or user input performed relative to a first 3D toolbar element may cause the 3D controller to execute a first action, and the same gesture or user input performed relative to a second 3D toolbar may cause the 3D controller to execute a different second action.

Figure 1:
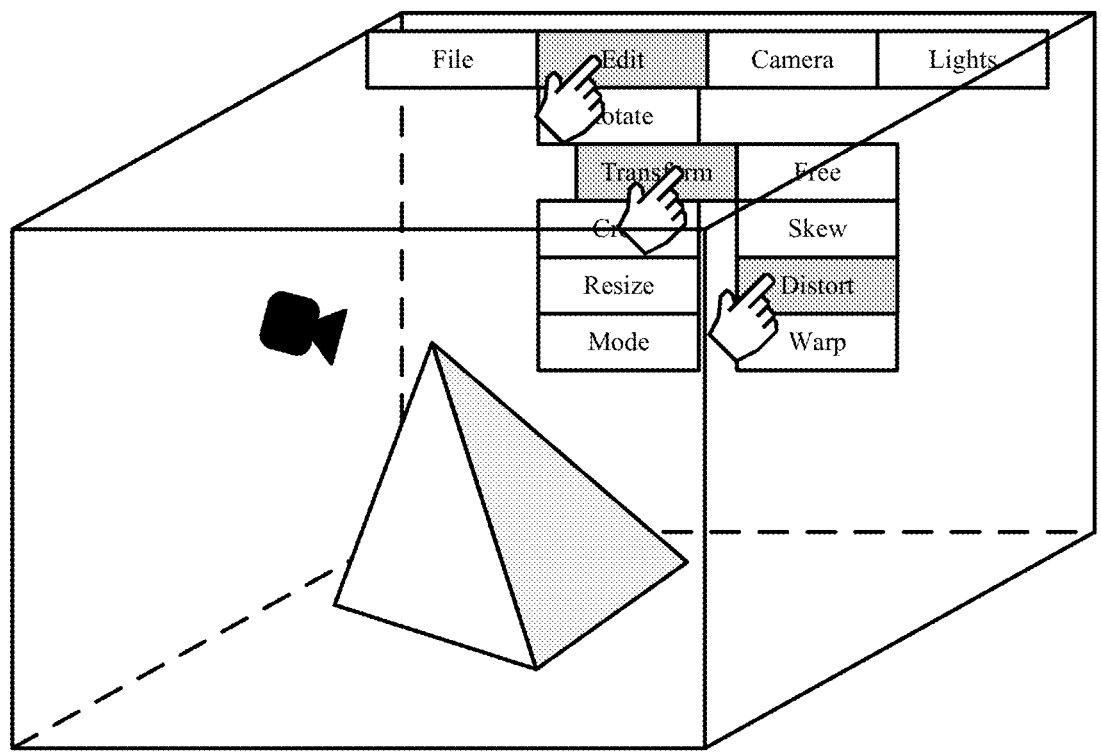
FIG. 1 illustrates an example of a static two-dimensional ("2D") menu system in a three-dimensional ("3D") environment.

FIG. 1 illustrates an example of a static 2D menu system in a 3D environment. The 2D menu system is presented across the x and y planes and is interacted with across two dimensions despite the GUI presenting and allowing for interactions with 3D objects across three dimensions. For instance, a user clicks on a menu heading causing an expansion of organized functionality or icons underneath the menu heading. Menu subheadings containing additional functionality or icons are similarly expanded across two dimensions.

Figure 2:
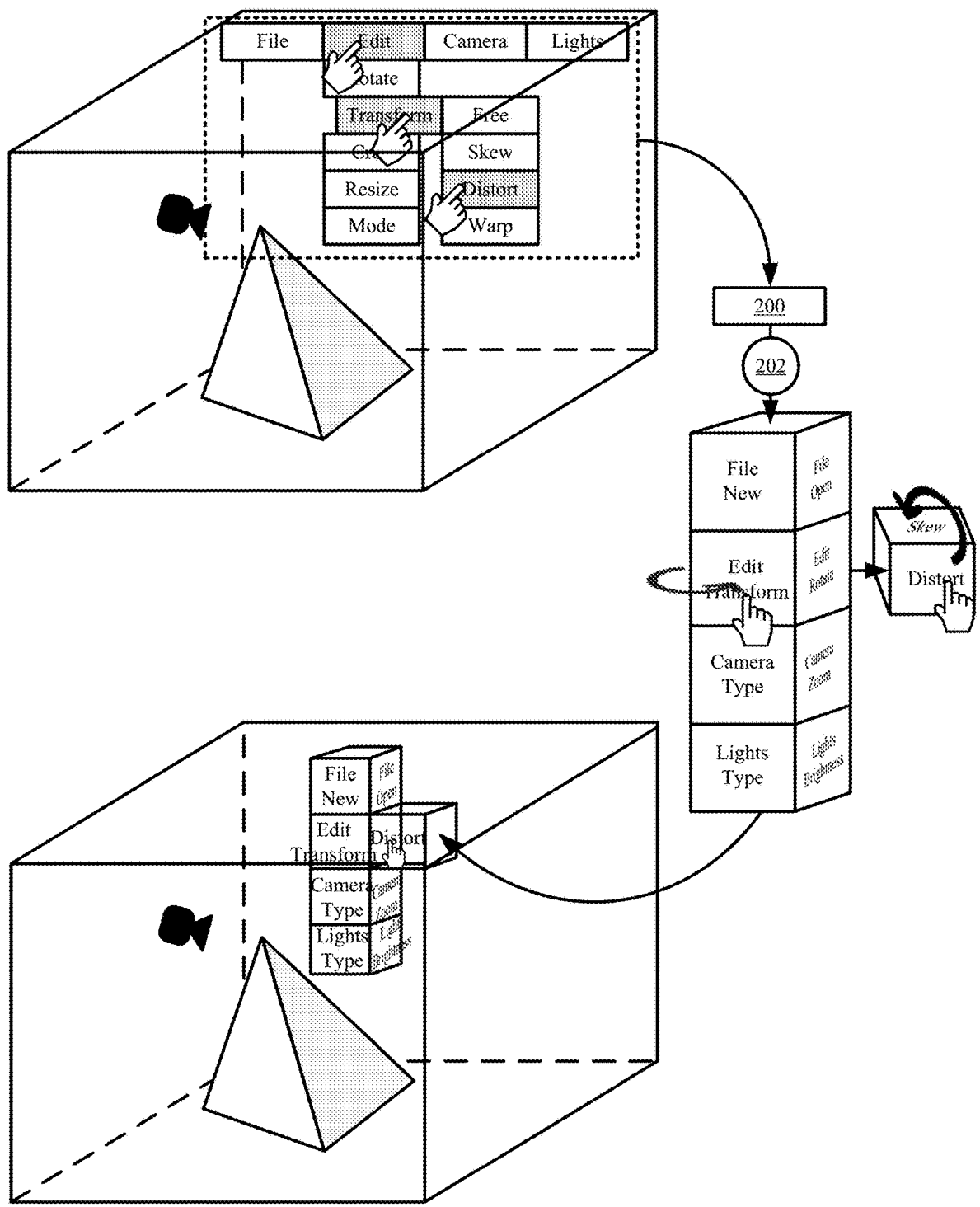
FIG. 2 illustrates an example of replacing the static 2D menu system with a dynamic 3D menu system in accordance with some embodiments presented herein.

FIG. 2 illustrates an example of replacing the static 2D menu system with a dynamic 3D menu system in accordance with some embodiments presented herein. 3D controller 200 generates (at 202) the dynamic 3D menu system. Specifically, 3D controller 200 generates (at 202) the dynamic 3D menu system as a stacked arrangement of 3D menu elements.

Each 3D menu element may have three or more sides or regions with each side or region corresponding to a different 2D menu heading or subheadings under a particular 2D menu heading. Each 3D menu element side or region may be interacted with and/or expanded to access or execute the functionality and/or icons associated with the represented menu heading or subheading. Accordingly, the 3D menu system provides a more compact and organized representation of the 2D menu functionality or icons.

For example, the 2D menu system has a single menu heading that is expanded to present several icons for changing font or text sizing, coloring, positioning, and formatting, several icons for changing paragraph styling, layout, positioning, and formatting, and several icons for changing page margins, sizing, orientation, and/or other page formatting options. Rather than present all these functionalities or icons under the same menu heading, the 3D menu system groups related sets of functionalities or icons from different menu subheadings to the different sides or selectable regions of a particular 3D menu element. Continuing with the example above, an interaction with a first side or region of the particular 3D menu element provides access to the 3D GUI elements for changing the font or text sizing, color, positioning, and formatting, an interaction with a second side or region of the particular 3D menu element provides access to the 3D GUI elements for changing the paragraph styling, layout, positioning, and formatting, and an interaction with a third side or region of the particular 3D menu element provides access to the 3D GUI elements for changing the page margins, sizing, orientation, and/or formatting options.

The arrangement of the menu headings and subheadings to the 3D menu elements do not overwhelm a user with myriad of functionalities and icons. Instead, the 3D arrangement provides organized and structured presentation of the functionalities and icons. 3D controller 200 takes advantage of the 3D nature and interactivity associated with each 3D menu element, and reduces the clutter associated with complex menu systems by organizing the functionalities and icons across three dimensions rather than placing all functionalities and icons in a single 2D plane.

3D controller 200 may dynamically populate the 3D GUI elements of a 3D menu or a 3D toolbar with different numbers of sides or interactive regions based on different sub-headings, functionality, or icons that are associated with each 3D GUI element. For instance, a first 3D menu element representing a first set of related functionality may have three sides or three interactive regions for accessing three different functionalities or icons of the first set of related functionality, and a second 3D menu element representing a second set of related functionality may have five sides or five interactive regions for accessing five different functionalities or icons of the second set of related functionality.

Figure 3:
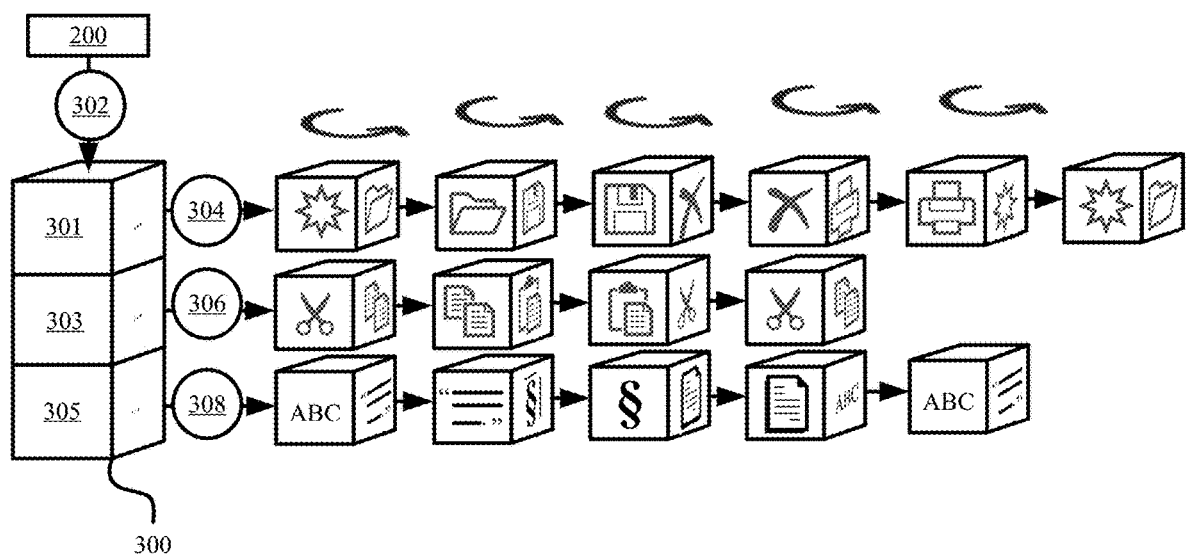
FIG. 3 illustrates an example of dynamically generating a 3D toolbar with 3D GUI elements that provide access to different numbers of functionalities or icons in accordance with some embodiments presented herein.

FIG. 3 illustrates an example of dynamically generating a 3D toolbar with 3D GUI elements that provide access to different numbers of functionalities or icons in accordance with some embodiments presented herein. 3D controller 200 generates (at 302) 3D toolbar 300 as a stacked arrangement of first 3D element 301, second 3D element 303, and third 3D element 305.

First GUI element 301 provides access to a related group of five different functionalities. Accordingly, 3D controller 200 dynamically generates first GUI element 301 with five distinct interactive regions, and cycles (at 304) through the presentation of the fives regions as first GUI element 301 is rotated in response to user input. In some embodiments, the five interactive regions may correspond to different sides of first GUI element 301. In some embodiments, the five interactive regions may corresponds to the same or different sized parts of first GUI element 301 that may be used to select or invoke a different functionality from the related group of five different functionalities.

Although shown as a cube, first GUI element 301 may have other forms or shapes with the first distinct interactive regions. For instance, first GUI element 301 may be presented as sphere with five distinct interactive regions that may be used to select or invoke each of the five different functionality. Alternatively, first GUI element 301 may be presented as a 5-sided 3D form such as a pentahedron that is rotated to present the regions for selecting or accessing each functionality from the related group of five different functionalities.

Second GUI element 303 provides access to a related group of three different functionalities. Accordingly, 3D controller 200 dynamically generates second GUI element 303 with three distinct interactive regions, and cycles (at 306) through the presentation of the three interactive regions as second GUI element 303 is rotated in response to user input.

Third GUI element 305 provides access to a related group of four different functionalities. Accordingly, 3D controller 200 dynamically generates third GUI element 305 with four distinct interactive regions, and cycles (at 308) through the presentation of the four interactive regions as third GUI element 305 is rotated in response to user input.

Figure 4:
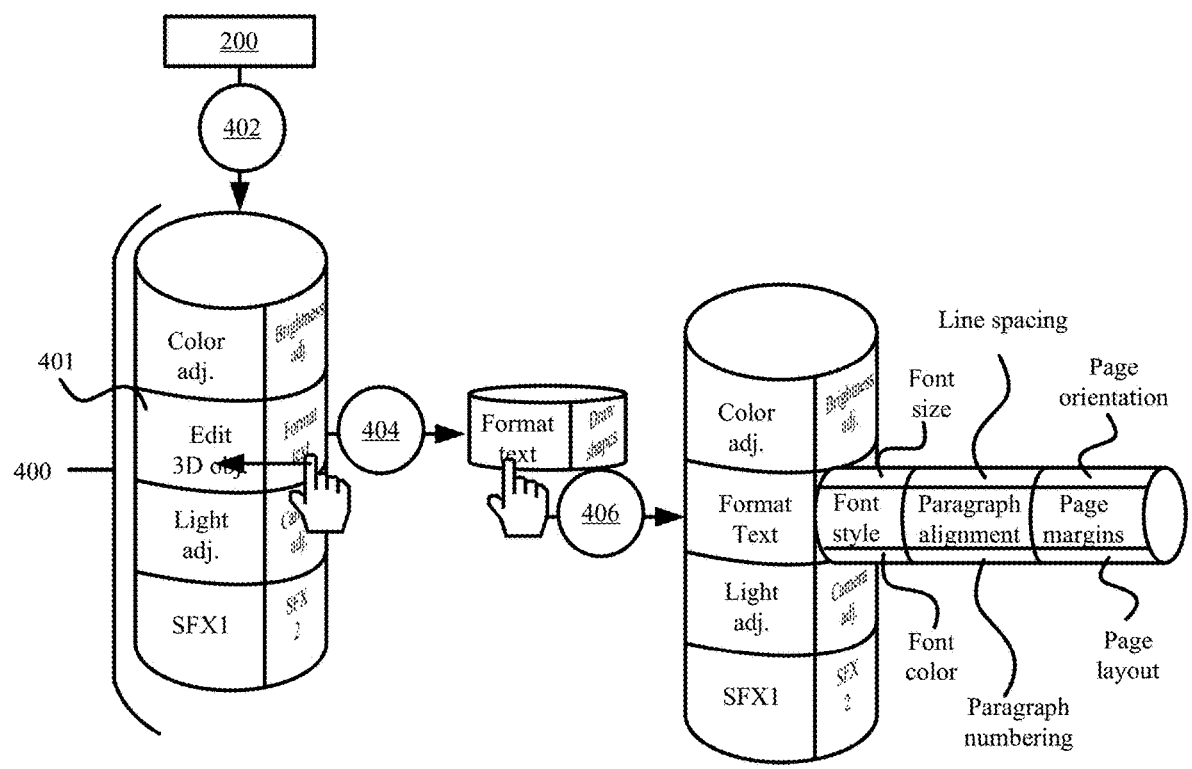
FIG. 4 illustrates an example of accessing different related groups of functionalities or icons across three dimensions of a 3D menu system in accordance with some embodiments presented herein.

FIG. 4 illustrates an example of accessing different related groups of functionalities or icons across three dimensions of a 3D menu system in accordance with some embodiments presented herein. 3D controller 200 generates (at 402) 3D menu system 400. In a collapsed or unexpanded state, 3D menu system 400 is presented as a connected set of 3D GUI elements.

3D controller 200 rotates (at 404) 3D menu system 400 in response to user input. Rotating (at 404) 3D menu system 400 exposes different sides, faces, or regions of rotated 3D GUI element 401 or different sides, faces, or regions of all 3D GUI elements of 3D menu system 400. For instance, 3D controller 200 may receive or detect a directional swipe gesture produced from a tracked hand movement, movement of a 3D controller, or input issued on a trackpad, touchpad, touchscreen, with a mouse, or another input device. In response to the user input, 3D controller 200 rotates the connected set of 3D GUI elements in relation to the direction, distance, and/or speed of the user input. In some embodiments, 3D controller 200 tracks the specific 3D GUI element on which the user input is issued, and rotates (at 404) the specific 3D GUI element independent of the other 3D GUI elements in the connected set of 3D GUI elements.

3D controller 200 expands (at 406) 3D menu system 400 to present the functionalities or icons that are accessible from or associated with the selected region or exposed side of 3D GUI element 401. The expansion (at 406) may occur automatically once rotation (at 404) to a particular region or side of 3D GUI element 401 is complete or in response to additional user input provided to the particular region side of 3D GUI element 401. For instance, 3D controller 200 receives or detects user input that involves touching, tapping, or otherwise selecting the particular region or side of 3D GUI element 401. In some embodiments, 3D controller 200 expands (at 406) 3D menu system 400 to present the functionalities or icons that are grouped under and are accessible from the 3D menu subheading associated with the particular region or side of 3D GUI element 401. Expanding (at 406) the functionalities associated with the particular region or side of 3D GUI element 401 includes presenting a subset of 3D GUI elements with different regions or sides of each 3D GUI element of the expanded subset of 3D GUI elements providing access to different functionalities, icons, or additional menu subheadings. As shown in FIG. 4, 3D controller 200 expands (at 406) the format text heading represented by the particular region or side of 3D GUI element 401, and presents a first 3D GUI subelement for changing different font properties, a second 3D GUI subelement for changing different paragraph properties, and a third 3D GUI subelement for page properties.

In some embodiments, 3D controller 200 expands all sides, faces, or regions of 3D GUI element 401 in response to user input. For instance, 3D controller 200 receives or detects user input that involves touching, tapping, or otherwise selecting one side of 3D GUI element 401 from the connected set of 3D GUI elements. Rather than just expand the functionalities or icons associated with the selected side, 3D controller 200 expands all sides of 3D GUI element 401 to present the functionalities or icons that are grouped under and/or are accessible from each 3D menu subheading associated with a different side of the selected 3D GUI element 401. 3D controller 200 may rotate 3D menu system 400 to present the 3D GUI subelements that are expanded from the selected side of 3D GUI element 401 directly in the field-of-view. Specifically, the expanded 3D GUI elements are presented parallel to the screen plane or perpendicular to the camera or render position of the 3D environment. In other words, 3D controller 200 determines the angle and/or orientation at which the user is viewing the 3D environment, and 3D controller 200 rotates 3D menu system 400 so that the expanded 3D GUI subelements from a selected side of 3D GUI element 401 are presented parallel to the viewing plane of the 3D environment.

Figure 5:
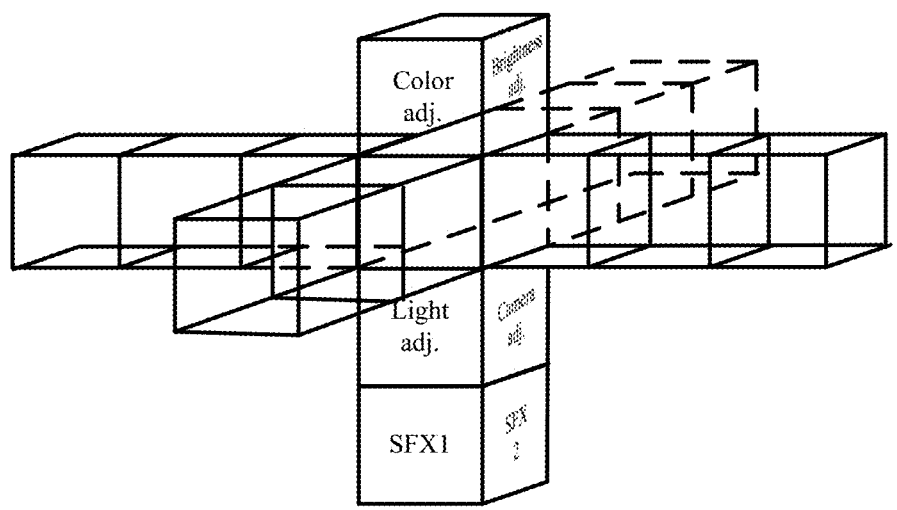
FIG. 5 illustrates an example of expanding all sides, faces, or regions of a selected 3D GUI element in accordance with some embodiments presented herein.

FIG. 5 illustrates an example of expanding all sides, faces, or regions of a selected 3D GUI element in accordance with some embodiments presented herein. Each set of 3D GUI subelements that are expanded from one face of the selected 3D GUI element are associated or provide related functionality. For instance, the set of 3D GUI subelements expanded from the right face of the selected 3D GUI element may provide font, paragraph, and page editing functionalities for editing text, the set of 3D GUI subelements expanded from the left face of the selected 3D GUI element may provide scaling, transforming, rotating, and other functionalities for editing 3D objects, the set of 3D GUI subelements expanded from the front face of the selected 3D GUI element may provide shape, freeform, and other 3D drawing tools for creating 3D objects, and the set of 3D GUI subelements expanded from the back face of the selected 3D GUI element may provide shape, freeform, and other drawing 2D drawings tools for creating 2D objects. 3D controller 200 may receive user input to rotate the 3D menu system and to present the different expanded sets of 3D GUI subelements that are expanded from the different faces of a selected 3D GUI element.

In some embodiments, 3D controller 200 dynamically expands the 3D GUI elements of the 3D menu system based on the functionalities or icons of the 3D GUI subelements that are associated with or accessible from each expanded 3D GUI element. In other words, 3D controller 200 does not expand each 3D GUI element about a single side, but may intelligently expand the 3D GUI subelements from different sides in order to simplify access to the underlying functionalities.

Figure 6:
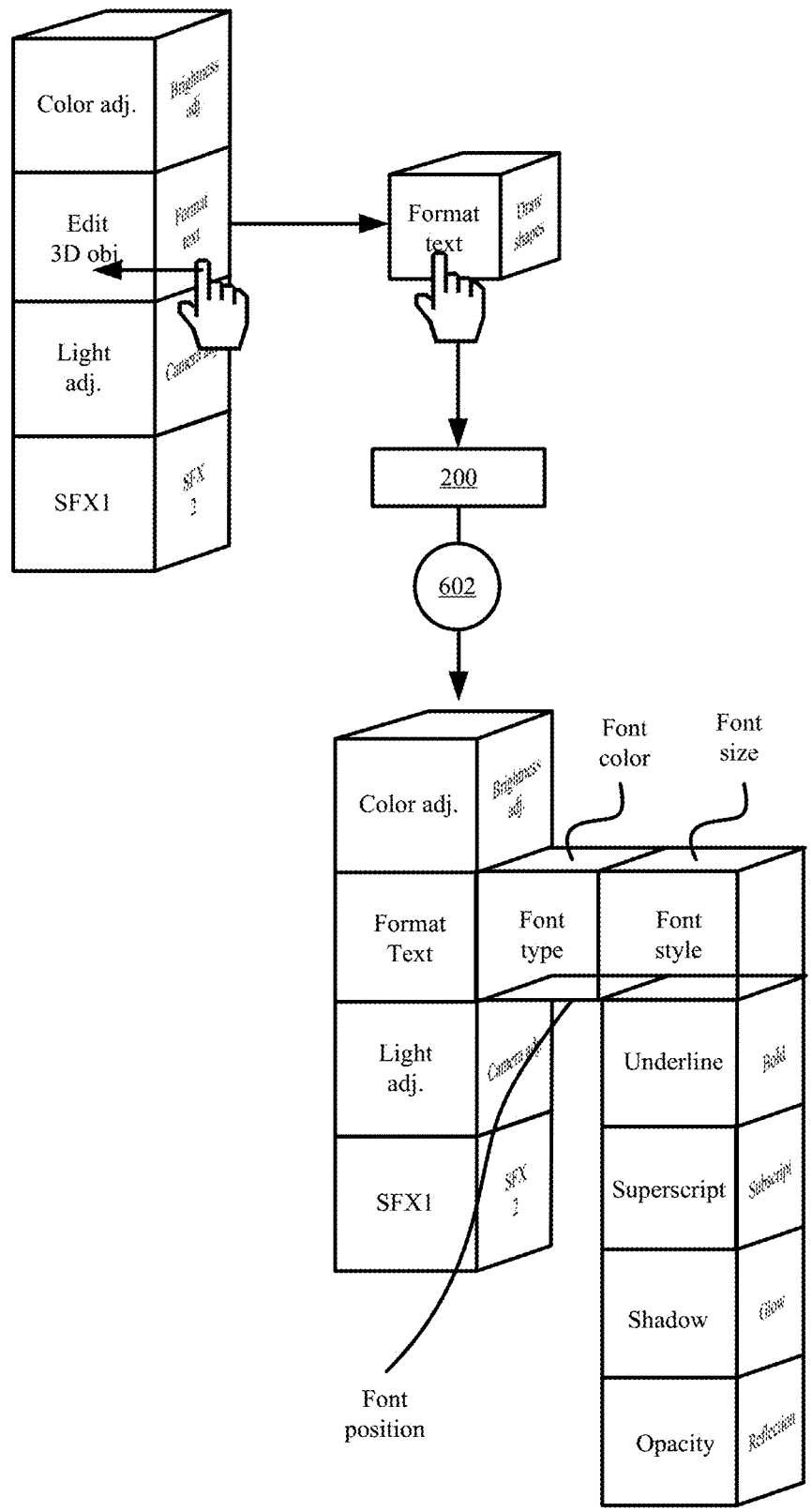
FIG. 6 illustrates an example of dynamically expanding different 3D GUI elements from a 3D menu or 3D toolbar in accordance with some embodiments presented herein.

FIG. 6 illustrates an example of dynamically expanding different 3D GUI elements from a 3D menu or 3D toolbar in accordance with some embodiments presented herein. 3D controller 200 maps the functionalities and/or icons that are associated with each 3D GUI element of the 3D menu or 3D toolbar.

In response to user selection of a 3D GUI element that contains or provides access to several menu sublayers, 3D controller 200 performs (at 602) a horizontal expansion of a first set of 3D subelements for a first menu sublayer associated with a selected side of the first 3D UI element, and then a vertical expansion of a second set of 3D subelements for a second menu sublayer associated with the first menu sublayer and a second side of one 3D element from the first set of 3D subelements. 3D controller 200 may continue with this changing horizontal and vertical expansion until no other menu sublayer or 3D subelements are stored in the 3D hierarchy. In some embodiments, the vertical expansion may occur in response to a user selecting or interacting with a particular side of a 3D subelement from the first set of 3D subelements.

Figure 7:
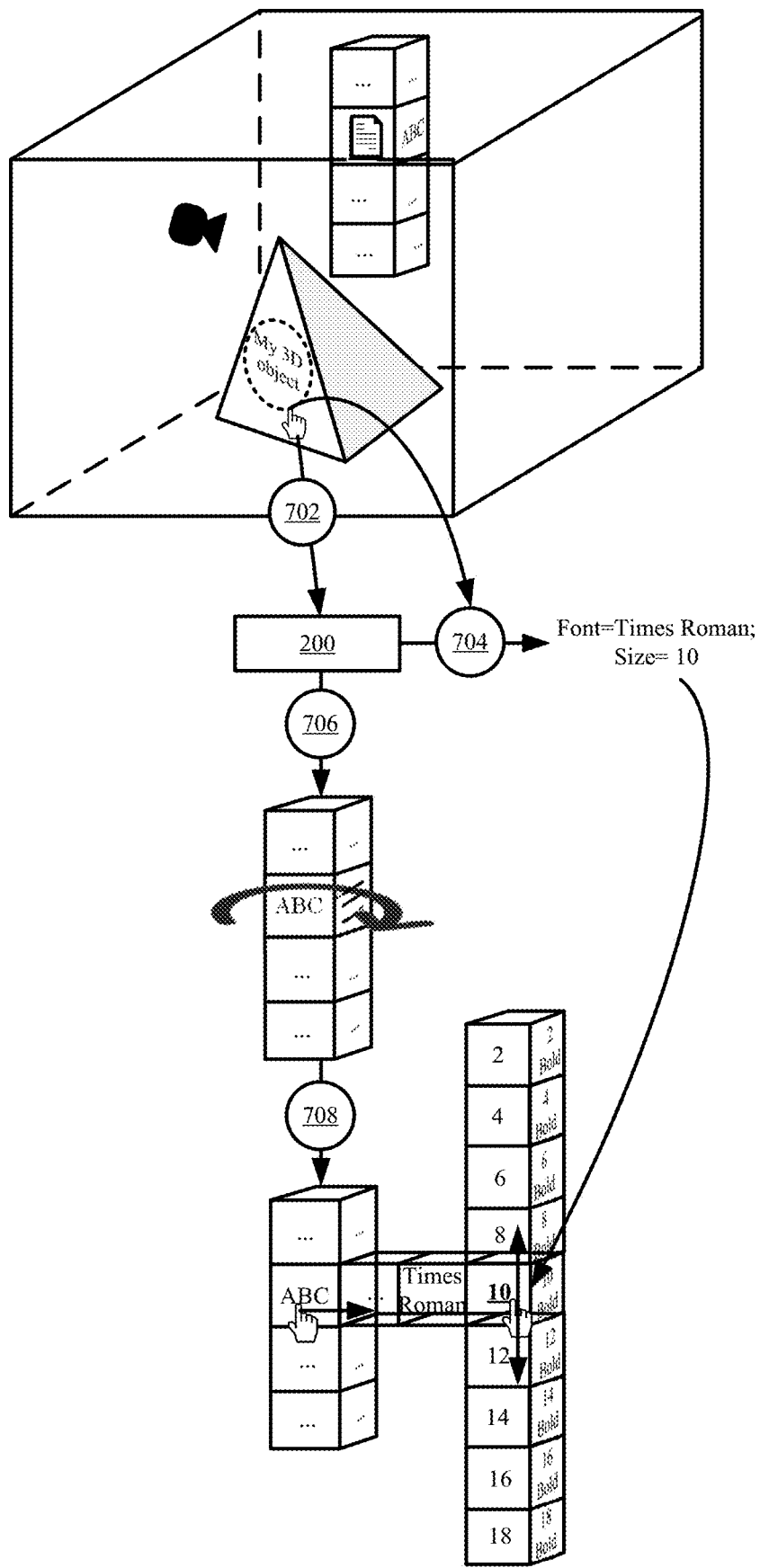
FIG. 7 illustrates an example of dynamically expanding a 3D GUI element based on relevant state in accordance with some embodiments presented herein.

In some embodiments, 3D controller 200 changes the expansion of different 3D GUI elements based on a current state of the data and the functionality associated with each of the 3D GUI elements. FIG. 7 illustrates an example of dynamically expanding a 3D GUI element based on relevant state in accordance with some embodiments presented herein.

3D controller 200 detects (at 702) a user selection of text or a 3D object with text in a 3D environment. 3D controller 200 determines (at 704) the user selection includes text, and determines (at 704) state associated with the selected text. The state associated with the selected text includes the font and font size of the selected text.

3D controller 200 automatically rotates (at 706) and/or expands (at 708) a 3D editing toolbar to present font editing functionality. For instance, the 3D toolbar includes a set of connected 3D GUI elements with a first side of a particular 3D GUI element from the set of connected 3D GUI elements being associated with page editing functionality, a second side of the particular 3D GUI element being associated with different font editing functionality, and a third side of the particular 3D GUI element being associated with different sentence editing functionality. 3D controller 200 rotates (at 706) the particular 3D GUI element so that the second side of the particular 3D GUI element is turned to the front of the 3D toolbar. In some embodiments, 3D controller 200 delays expanding (at 708) the particular 3D GUI element until the user selects the second side of the particular 3D GUI element that is associated with the font editing functionality. 3D controller 200 may also delay expanding (at 708) the subelements for changing the font size until the user selects the font size subelement. 3D controller 200 dynamically expands (at 708) the font size subelement according to the associated state obtained for the font size subelement. In this case, the font size subelement is used to adjust the font size of the selected text. Accordingly, the associated state includes the current font size of the selected text, and dynamically expanding (at 708) the font size subelement includes presenting the next smaller font sizes above the font size subelement and the next larger font sizes below the font size subelement with the font size subelement displaying the current font size of the selected text. In other words, rather than present all selectable font sizes by expanding a set of 3D GUI subelements below the font size subelement, 3D controller 200 dynamically changes the presentation of the selected side of the font size subelement to present the current font size, expands a first set of 3D GUI subelements above the font size subelement for selecting smaller font sizes, and expands a second set of 3D GUI subelements below the font size subelements for selecting larger font sizes.

Dynamically expanding the 3D GUI elements may therefore include changing the presentation of a selected side of a 3D GUI element to present state information associated the functionality that is accessed from that 3D GUI element. Specifically, 3D controller 200 initially presents the 3D toolbar GUI elements with icons or descriptions of the functionalities accessible from each of the 3D toolbar GUI elements. Once a particular 3D GUI element is selected with user input, 3D controller 200 changes the presentation of the particular 3D GUI element to present relevant state information for the functionality or functionalities that are accessible from that particular 3D GUI element.

In some embodiments, 3D controller 200 dynamically changes or executes different actions or operations in response to common interactions with different 3D GUI elements or subelements. For instance, interacting (e.g., swiping up) with a first 3D UI subelement may cause 3D controller 200 to execute a first action or first functionality associated with the first 3D GUI subelement, and the same interaction (e.g., swiping up) with a second UI subelement may cause 3D controller 200 to execute a different second action or second functionality associated with the second 3D GUI subelement.

Figure 8:
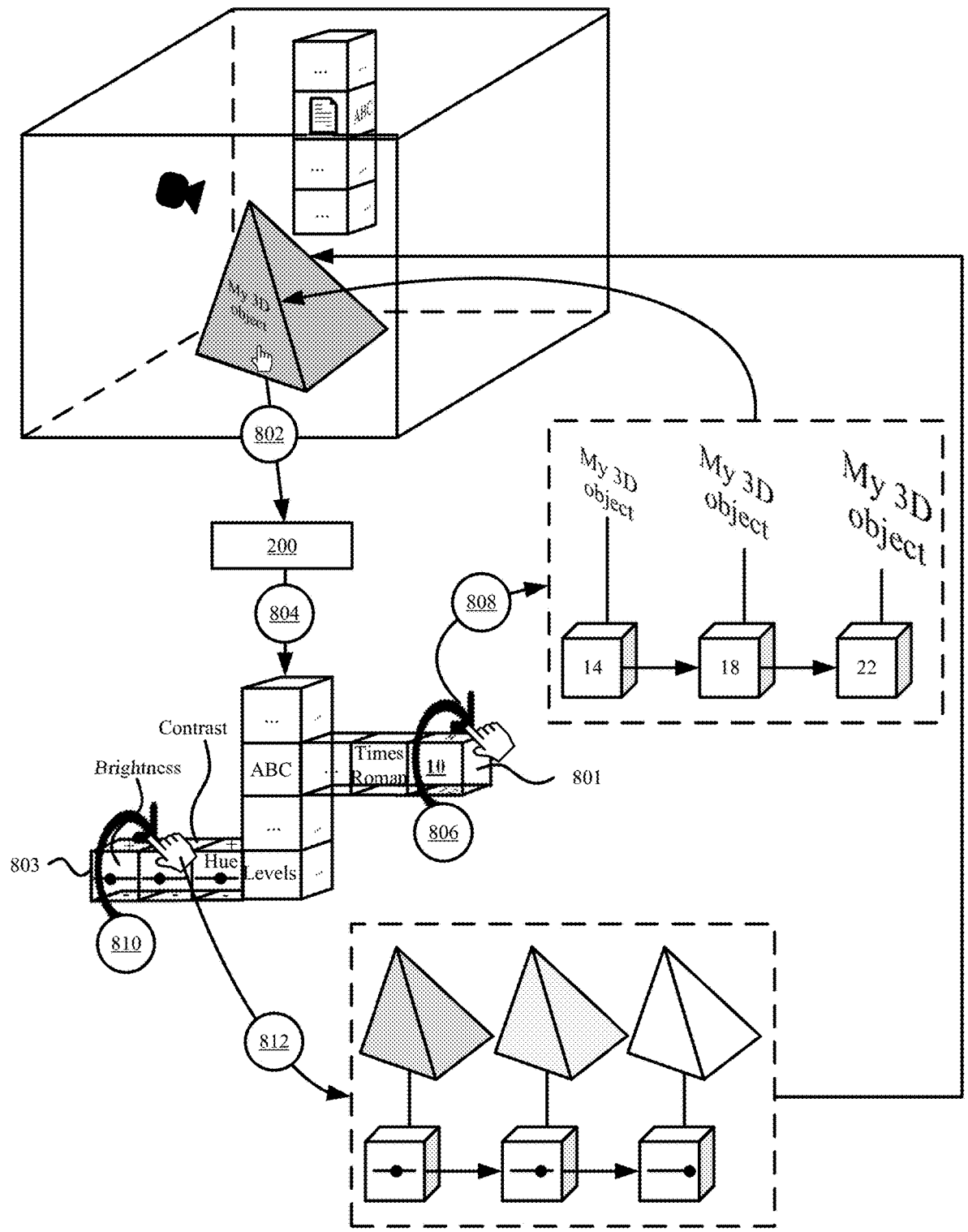
FIG. 8 illustrates an example of executing different dynamic functionality based on the same interactions with different 3D GUI elements of a 3D menu or 3D toolbar in accordance with some embodiments presented herein.

FIG. 8 illustrates an example of executing different dynamic functionality based on the same interactions with different 3D GUI elements of a 3D menu or 3D toolbar in accordance with some embodiments presented herein. 3D controller 200 detects (at 802) a selection of a 3D object that includes editable text and color.

3D controller 200 tracks various state associated with the selection and/or the 3D environment, generates a 3D menu system with different 3D access to different functionality for interacting with the selection and/or the 3D environment, and expands (at 804) the 3D menu system based on the tracked state. Expanding (at 804) the 3D menu system includes presenting present a first set of 3D GUI subelements for editing text and a second set of 3D GUI subelements for editing levels (e.g., brightness, hue, contrast, etc.) of the selection and/or the 3D environment. 3D controller 200 may expand (at 804) the 3D menu system automatically or in response to user input. The first set of 3D GUI subelements includes font size editing 3D subelement 801, and the second set of 3D GUI subelements includes brightness changing 3D subelement 803. 3D controller 200 may dynamically adjust font size editing 3D subelement 801 to present the current font size for the text of the selected 3D object or the font size of the selected text, and may dynamically adjust brightness changing 3D subelement 803 to present the current brightness of the selected 3D object or of the 3D environment.

3D controller 200 receives (at 806) a first user input that involves an upward rotation of font size editing 3D subelement 801. For instance, the user performs an upward swipe or slide gesture over font size editing 3D subelement 801.

3D controller 200 determines that the first user input was issued with respect to font size editing 3D subelement 801, retrieves the current font size based on the tracked state, determines the application programming interface ("API") call, command, or other instruction that is associated with font size editing 3D subelement 801, and increases (at 808) the font size of the selected text in response to the upward rotation of font size editing 3D subelement 801 and calling or executing the API call, command, or other instruction that is associated with font size editing 3D subelement 801 with parameters determined from the direction, intensity, distance, and speed associated with the first user input. Specifically, 3D controller 200 gradually increases or scrolls through bigger font sizes based on the direction, intensity, distance, and speed associated with the first user input.

3D controller 200 receives (at 810) a second user input that involves an upward rotation of brightness changing 3D subelement 803. The second user input may mirror the first user input except that it is performed on a different 3D subelement that is associated with different functionality.

3D controller 200 determines that the second user input was issued with respect to brightness changing 3D subelement 803, retrieves the current brightness value based on the tracked state, determines the API call, command, or other instruction that is associated with brightness changing 3D subelement 803, and adjusts (at 812) the brightness of the selected 3D object or the 3D environment in the direction of the second user input. For instance, the upwards rotation causes a gradual brightness increase, whereas a downwards rotation may cause a gradual brightness decrease. In any case, 3D controller 200 adapts the same gestures or inputs (e.g., the first user input and the second user input) to execute the different functionality associated with the different 3D elements and 3D subelements of the 3D menu or 3D toolbar.

Figure 9:
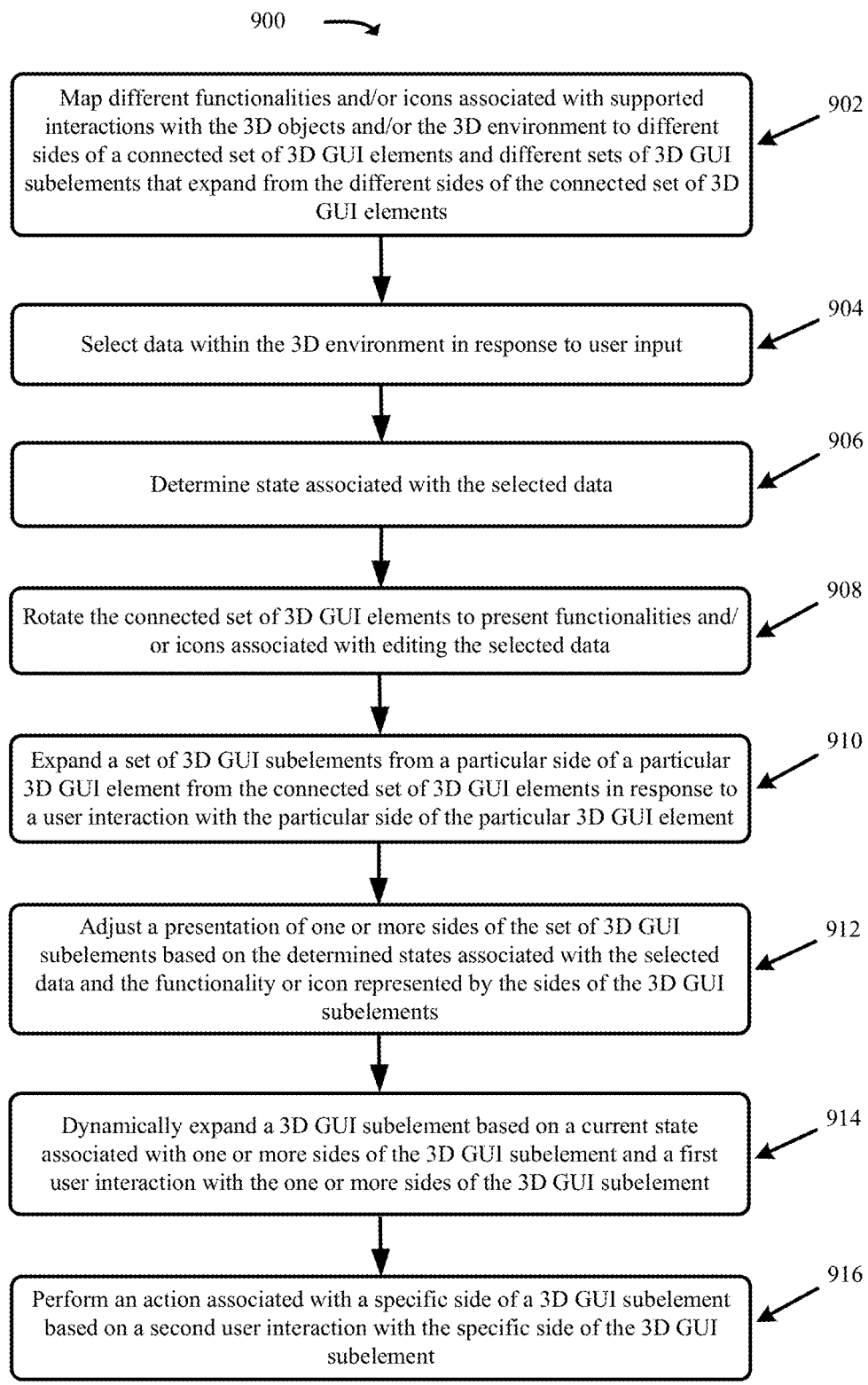
FIG. 9 presents a process for controlling computer operation based on dynamically expanding 3D menus or 3D toolbars and dynamic functionality associated with the expanded 3D GUI elements in accordance with some embodiments presented herein.

FIG. 9 presents a process 900 for controlling computer operation based on dynamically expanding 3D menus or 3D toolbars and dynamic functionality associated with the expanded 3D GUI elements in accordance with some embodiments presented herein. Process 900 is implemented by 3D controller 200. 3D controller 200 executes on one or more devices or machines with processor, memory, storage, network, and/or other hardware resources that generate and present an interactive 3D environment with 3D objects. 3D controller 200 generates the 3D menus or 3D toolbars for interacting with the 3D objects and for executing the different functionalities associated with the 3D GUI of the 3D menus or 3D toolbars using 3D inputs.

Process 900 includes mapping (at 902) different functionalities and/or icons associated with supported interactions with the 3D objects and/or the 3D environment to different regions of a connected set of 3D GUI elements and different sets of 3D GUI subelements that expand from the different regions of the connected set of 3D GUI elements. Specifically, 3D controller 200 defines a 3D GUI element to provide access to a related but different set of functionalities or icons from different regions or faces of the 3D GUI element, creates a connected set of 3D GUI elements to access the different functionalities and/or icons, and creates expandable 3D GUI subelements for additional layers, adjustable settings, and/or other functionalities or icons that are accessible from the functionalities, icons, or menu layer represented by a parent 3D GUI element.

In some embodiments, mapping (at 902) the different functionalities and/or icons includes mapping functionalities and/or icons from a 2D menu system or 2D toolbar to the different regions of the connected set of 3D GUI elements. In some such embodiments, 3D controller 200 analyzes the functionalities and/or icons under each menu heading, groups related sets of functionalities and/or icons under a menu heading to a different region or face of a 3D GUI element, and connects the 3D GUI elements for the different partitioned menu headings as an interactive 3D menu or 3D toolbar. In some other embodiments, mapping (At 902) the different functionalities and/or icons includes determining the API calls, commands, and/or other instructions that are supported by a 3D editing application, and assigning groups of related API calls, commands, or other instructions to different regions of a 3D GUI element.

3D controller 200 may perform a dynamic mapping (at 902) of the functionalities and/or icons to the 3D GUI elements. Specifically, 3D controller 200 may map a first related group of three API calls to a first 3D GUI element with three regions, and may map a second related group of five API calls to a second 3D GUI element with five regions. In other words, the number of regions associated with each 3D GUI element may be dynamically determined based on the functionalities or icons that are mapped to and/or are accessible from that 3D GUI element.

Process 900 includes selecting (at 904) data within the 3D environment in response to user input. For instance, a user uses a lasso, marquee, or other selection tool to select a 3D object, part of a 3D object, or a region of space in the 3D environment.

Process 900 includes determining (at 906) state associated with the selected (at 904) data. 3D controller 200 may analyze the selected data, determine different states or values associated with the selected (at 904) data that may be modified based on functionalities or icons associated with different regions of the 3D GUI elements and the 3D GUI subelements, and map the current state associated with the data that may be modified from a particular region of a 3D GUI element or 3D GUI subelement to that particular region of the 3D GUI element or 3D GUI subelement.

Process 900 includes rotating (at 908) the connected set of 3D GUI elements to present functionalities and/or icons associated with editing the selected (at 904) data. For instance, 3D controller 200 rotates (at 908) to present the 3D GUI elements for editing text when text is selected, the 3D GUI elements for editing 3D objects when one or more 3D objects are selected, the 3D GUI elements for editing visual characteristics or attributes of a 3D object when part or a region of a 3D object is selected, and/or the 3D GUI elements for adjusting lighting when a light source is selected.

Process 900 includes expanding (at 910) a set of 3D GUI subelements from a particular region of a particular 3D GUI element from the connected set of 3D GUI elements in response to a user interaction with the particular region of the particular 3D GUI element. 3D controller 200 identifies the functionalities and/or icons that are accessible from and/or associated with the particular region of the particular 3D GUI element, and performs the outwards expansion of the set of 3D GUI subelements to provide access to those functionalities and/or icons. Expanding (at 910) the set of 3D GUI subelements may include rotating the particular 3D GUI element to present the particular region of the particular 3D GUI element parallel with or directly facing the field-of-view, and presenting the set of 3D GUI subelements from a region of the particular 3D GUI element.

Process 900 includes adjusting (at 912) a presentation of one or more regions of the set of 3D GUI subelements based on the determined (at 906) states associated with the selected (at 904) data and the functionality or icon represented by the regions of the 3D GUI subelements. Adjusting (at 912) the presentation includes replacing a generic description or icon that represents the accessible functionality from a region of a 3D GUI subelement with the value for the state that may be adjusted using the functionality represented by that region of the 3D GUI subelement. For instance, rather than presenting a generic description that a first region of the 3D GUI subelement may be used to change the brightness of a light source and that a second region of the 3D GUI subelements may be used to change the color temperature of the light source, 3D controller 200 may change the first region of the 3D GUI subelement to present the current brightness value of the light source and the second region of the 3D GUI subelement to present the current color temperature of the light source.

Process 900 includes dynamically expanding (at 914) a 3D GUI subelement based on a current state associated with one or more regions of the 3D GUI subelement and a first user interaction with the one or more regions of the 3D GUI subelement. The dynamic expansion (at 914) may include performing a single-region expansion below, above, or to a side of the 3D GUI subelement or a multi-sided expansion from below and above or from both sides of the 3D GUI subelement. For instance, the multi-sided expansion may include presenting functionalities for decreasing the current state above the 3D GUI subelement and presenting functionalities for increasing the current state below the 3D GUI subelement.

Process 900 includes performing (at 916) an action associated with a specific region of a 3D GUI subelement based on a second user interaction with the specific region of the 3D GUI subelement. The second user interaction may include selection of a functionality or icon that is presented in an expanded set of 3D GUI subelements or a gesture (e.g., swipe, slide, flick, etc.) that includes one or more of a directional component, speed component, and distance component for executing the functionality associated with the specific region of the 3D GUI subelement with different parameters.

Figure 10:
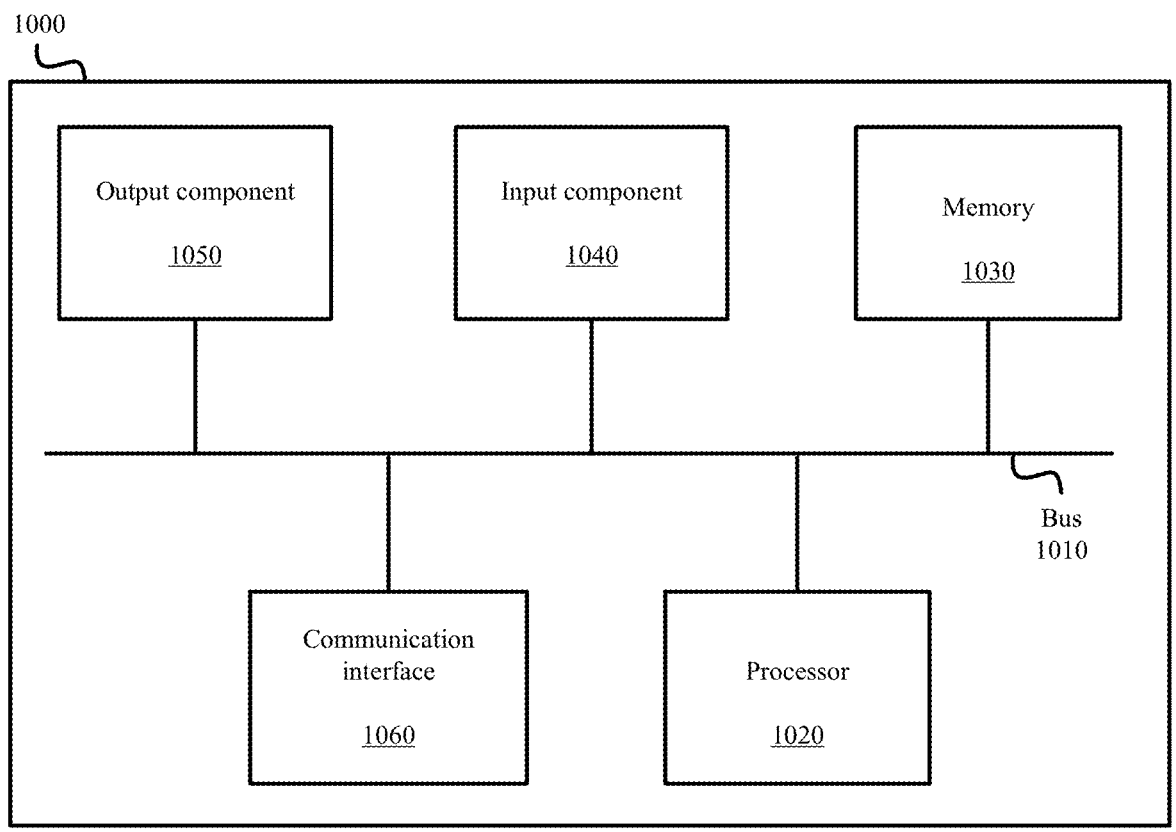
FIG. 10 illustrates example components of one or more devices, according to one or more embodiments described herein.

FIG. 10 is a diagram of example components of device 1000. Device 1000 may be used to implement one or more of the devices or systems described above (e.g., 3D controller 200). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
generating a first three-dimensional ("3D") graphical user interface ("GUI") element with a first number of regions with each region of the first number of regions providing access to different functionality from a first set of functionality;
mapping different text editing functionality from the first set of functionality to each region of the first 3D GUI element;
generating a second 3D GUI element with a second number of regions with each region of the second number of regions providing access to different functionality from a second set of functionality;
mapping different shape editing functionality from the second set of functionality to each region of the second 3D GUI element;
connecting the first 3D GUI element to the second 3D GUI element; and
rotating one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element.

2. The method of claim 1 further comprising:
detecting an interaction with a particular region of the second 3D GUI element ; and
expanding a set of 3D GUI subelements from the second 3D GUI element in response to detecting the interaction, wherein expanding the set of 3D GUI subelements comprises presenting the set of 3D GUI subelements with a horizontal arrangement in response to connecting the first 3D GUI element to the second 3D GUI element in a vertical arrangement, and presenting the set of 3D GUI subelements with a vertical arrangement in response to connecting the first 3D GUI element to the second 3D GUI element in a horizontal arrangement.

3. The method of claim 1,
wherein mapping the different text editing functionality comprises mapping the first set of functionality that is organized under a first two-dimensional ("2D") menu heading to a different region of the first number of regions of the first 3D GUI element; and wherein mapping the different shape editing functionality comprises mapping the second set of functionality that is organized under a second 2D menu heading to a different region of the second number of regions of the second 3D GUI element.

4. The method of claim 1, wherein generating the first 3D GUI element comprises:
accessing functionality associated with a first 2D menu heading from a first region of the first 3D GUI element; and
accessing functionality associated with a second 2D menu heading from a second region of the first 3D GUI element.

5. The method of claim 1 further comprising:
expanding a first 3D GUI subelement from a region of the first 3D GUI element; and
expanding a second 3D GUI subelement from a region of the second 3D GUI element.

6. The method of claim 5 further comprising:
detecting a particular user interaction with the first 3D GUI subelement;
executing a first action in response to detecting the particular user interaction with the first 3D GUI subelement and the first 3D GUI subelement being associated with the first action;
detecting the particular user interaction with the second 3D GUI subelement; and
executing a different second action in response to detecting the particular user interaction with the second 3D GUI subelement and the second 3D GUI subelement being associated with the different second action.

7. The method of claim 5 further comprising:
determining a first state and a second state associated with one or more objects presented in a 3D environment;
presenting the first state on an exposed region of the first 3D GUI subelement based on the first 3D GUI subelement being associated with a first functionality for changing the first state; and
presenting the second state on an exposed region of the second 3D GUI subelement based on the second 3D GUI subelement being associated with a second functionality for changing the first state.

8. The method of claim 5, wherein expanding the first 3D GUI subelement comprises:
mapping a first executable command that is associated with the different functionality that is accessible from the region of the first 3D GUI element to a first region of the first 3D GUI subelement; and
mapping a second executable command that is associated with the different functionality that is accessible from the region of the first 3D GUI element to a second region of the first 3D GUI subelement.

9. The method of claim 5 further comprising:
rotating the first 3D GUI subelement in a first direction in response to a first user input;
increasing a value associated with a particular state of an editable object in response to rotating the first 3D GUI subelement in the first direction;
rotating the first 3D GUI subelement in an opposite second direction in response to a second user input; and
decreasing the value associated with the particular state of the editable object in response to rotating the first 3D GUI subelement in the opposite second direction.

10. The method of claim 5, wherein expanding the first 3D GUI subelement comprises:
presenting the first 3D GUI subelement from a first region of the first 3D GUI element in response to a user touch or tap applied to a second region of the first 3D GUI element that is perpendicular to the first region.

11. The method of claim 1 further comprising:
executing a first functionality from the first set of functionality in response to a user interaction with a first region of the first 3D GUI element or a 3D GUI subelement that is expanded from the first region of the first 3D GUI element; and
executing a second functionality from the first set of functionality in response to a user interaction with a second region of the first 3D GUI element or a 3D GUI subelement that is expanded from the second region of the first 3D GUI element.

12. The method of claim 1 further comprising:
presenting the first 3D GUI element connected to the second 3D GUI element in a 3D environment with a 3D object.

13. The method of claim 12 further comprising:
editing a first attribute of the 3D object in response to a user interaction with a first region of the first 3D GUI element and a first functionality from the first set of functionality being accessed from the first region of the first 3D GUI element; and
editing a second attribute of the 3D object in response to a user interaction with a second region of the first 3D GUI element and a second functionality from the first set of functionality being accessed from the second region of the first 3D GUI element.

14. A system comprising:
one or more hardware processors configured to:
generate a first three-dimensional ("3D") graphical user interface ("GUI") element with a first number of regions with each region of the first number of regions providing access to different functionality from a first set of functionality;
map different text editing functionality from the first set of functionality to each region of the first 3D GUI element;
generate a second 3D GUI element with a second number of regions with each region of the second number of regions providing access to different functionality from a second set of functionality;
map different shape editing functionality from the second set of functionality to each region of the second 3D GUI element;
connect the first 3D GUI element to the second 3D GUI element; and
rotate one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element.

15. A method comprising:
generating a first three-dimensional ("3D") graphical user interface ("GUI") element with a first number of regions with each region of the first number of regions providing access to different functionality from a first set of functionality;
generating a second 3D GUI element with a second number of regions with each region of the second number of regions providing access to different functionality from a second set of functionality;
connecting the first 3D GUI element to the second 3D GUI element;
rotating one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;
expanding a first 3D GUI subelement from a region of the first 3D GUI element;
expanding a second 3D GUI subelement from a region of the second 3D GUI element;
rotating the first 3D GUI subelement in a first direction in response to a first user input;
increasing a value associated with a particular state of an editable object in response to rotating the first 3D GUI element in the first direction;
rotating the first 3D GUI subelement in an opposite second direction in response to a second user input; and
decreasing the value associated with the particular state of the editable object in response to rotating the second 3D GUI element in the opposite second direction.

16. A system comprising:
one or more hardware processors configured to:
generate a first three-dimensional ("3D") graphical user interface ("GUI") element with a first number of regions with each region of the first number of regions providing access to different functionality from a first set of functionality;
generate a second 3D GUI element with a second number of regions with each region of the second number of regions providing access to different functionality from a second set of functionality;
connect the first 3D GUI element to the second 3D GUI element;
rotate one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;
expand a first 3D GUI subelement from a region of the first 3D GUI element;
expand a second 3D GUI subelement from a region of the second 3D GUI element;
rotating the first 3D GUI subelement in a first direction in response to a first user input;
increase a value associated with a particular state of an editable object in response to rotating the first 3D GUI subelement in the first direction;
rotate the first 3D GUI subelement in an opposite second direction in response to a second user input; and
decrease the value associated with the particular state of the editable object in response to rotating the first 3D GUI subelement in the opposite second direction.

17. A method comprising:
generating a first three-dimensional ("3D") graphical user interface ("GUI") element with a first number of regions with each region of the first number of regions providing access to different functionality from a first set of functionality;
generating a second 3D GUI element with a second number of regions with each region of the second number of regions providing access to different functionality from a second set of functionality;
connecting the first 3D GUI element to the second 3D GUI element;
rotating one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;
expanding a first 3D GUI subelement from a region of the first 3D GUI element, wherein expanding the first 3D GUI subelement comprises presenting the first 3D GUI subelement from a first region of the first 3D GUI element in response to a user touch or tap applied to a second region of the first 3D GUI element that is perpendicular to the first region; and
expanding a second 3D GUI subelement from a region of the second 3D GUI element.

18. A system comprising:
one or more hardware processors configured to:
generate a first three-dimensional ("3D") graphical user interface ("GUI") element with a first number of regions with each region of the first number of regions providing access to different functionality from a first set of functionality;
generate a second 3D GUI element with a second number of regions with each region of the second number of regions providing access to different functionality from a second set of functionality;
connect the first 3D GUI element to the second 3D GUI element;
rotate one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;
expand a first 3D GUI subelement from a region of the first 3D GUI element,
wherein expanding the first 3D GUI subelement comprises presenting the first 3D GUI subelement from a first region of the first 3D GUI element in response to a user touch or tap applied to a second region of the first 3D GUI element that is perpendicular to the first region; and
expand a second 3D GUI subelement from a region of the second 3D GUI element.

19. A method comprising:
generating a first three-dimensional ("3D") graphical user interface ("GUI") element with a first number of regions with each region of the first number of regions providing access to different functionality from a first set of functionality;
generating a second 3D GUI element with a second number of regions with each region of the second number of regions providing access to different functionality from a second set of functionality;
connecting the first 3D GUI element to the second 3D GUI element;
presenting the first 3D GUI element connected to the second 3D GUI element in a 3D environment with a 3D object;

rotating one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;

editing a first attribute of the 3D object in response to a user interaction with a first region of the first 3D GUI element and a first functionality from the first set of functionality being accessed from the first region of the first 3D GUI element; and editing a second attribute of the 3D object in response to a user interaction with a second region of the first 3D GUI element and a second functionality from the first set of functionality being accessed from the second region of the first 3D GUI element.

20. A system comprising:

one or more hardware processors configured to:

generate a first three-dimensional ("3D") graphical user interface ("GUI") element with a first number of regions with each region of the first number of regions providing access to different functionality from a first set of functionality;

generate a second 3D GUI element with a second number of regions with each region of the second number of regions providing access to different functionality from a second set of functionality;

connect the first 3D GUI element to the second 3D GUI element;

present the first 3D GUI element connected to the second 3D GUI element in a 3D environment with a 3D object;

rotate one or more of the first 3D GUI element and the second 3D GUI element in response to user input, wherein rotating the one or more of the first 3D GUI element and the second 3D GUI element comprises changing functionality that is accessible from the one or more of the first 3D GUI element and the second 3D GUI element;

edit a first attribute of the 3D object in response to a user interaction with a first region of the first 3D GUI element and a first functionality from the first set of functionality being accessed from the first region of the first 3D GUI element; and edit a second attribute of the 3D object in response to a user interaction with a second region of the first 3D GUI element and a second functionality from the first set of functionality being accessed from the second region of the first 3D GUI element.

* * * * *